United States Patent
Klomp

(10) Patent No.: US 6,305,363 B1
(45) Date of Patent: Oct. 23, 2001

(54) AIR-ASSISTED FUEL INJECTOR WITH OZONE ENRICHMENT

(75) Inventor: Edward Daniel Klomp, Clinton Township, Macomb County, MI (US)

(73) Assignee: General Motors Corporation, Detroit, MI (US)

(*) Notice: Subject to any disclaimer, the term of this patent is extended or adjusted under 35 U.S.C. 154(b) by 0 days.

(21) Appl. No.: 09/550,938

(22) Filed: Apr. 17, 2000

(51) Int. Cl.[7] .......................... F02M 67/02; F02B 47/06
(52) U.S. Cl. ................................. 123/533; 123/536
(58) Field of Search .................... 123/531, 533, 123/536–539

(56) References Cited

U.S. PATENT DOCUMENTS

| | | | |
|---|---|---|---|
| 4,308,844 | * 1/1982 | Persinger | 123/539 |
| 5,353,991 | 10/1994 | DeNagel et al. | 239/409 |
| 5,730,369 | 3/1998 | DeNagel et al. | 239/585.4 |
| 6,230,683 | * 5/2001 | Zur Loye et al. | 123/435 |

FOREIGN PATENT DOCUMENTS 10-205397 * 8/1998 (JP).

\* cited by examiner

*Primary Examiner*—Tony M. Argenbright
(74) *Attorney, Agent, or Firm*—George A. Grove; Jeffrey A. Sedlar

(57) ABSTRACT

An internal combustion engine fuel system has an air-assist fuel injection system. An air compressor and an ozone generator are positioned upstream of the injector system to supply a pressurized, ozone-enriched air stream to the air-assist fuel injector.

4 Claims, 1 Drawing Sheet

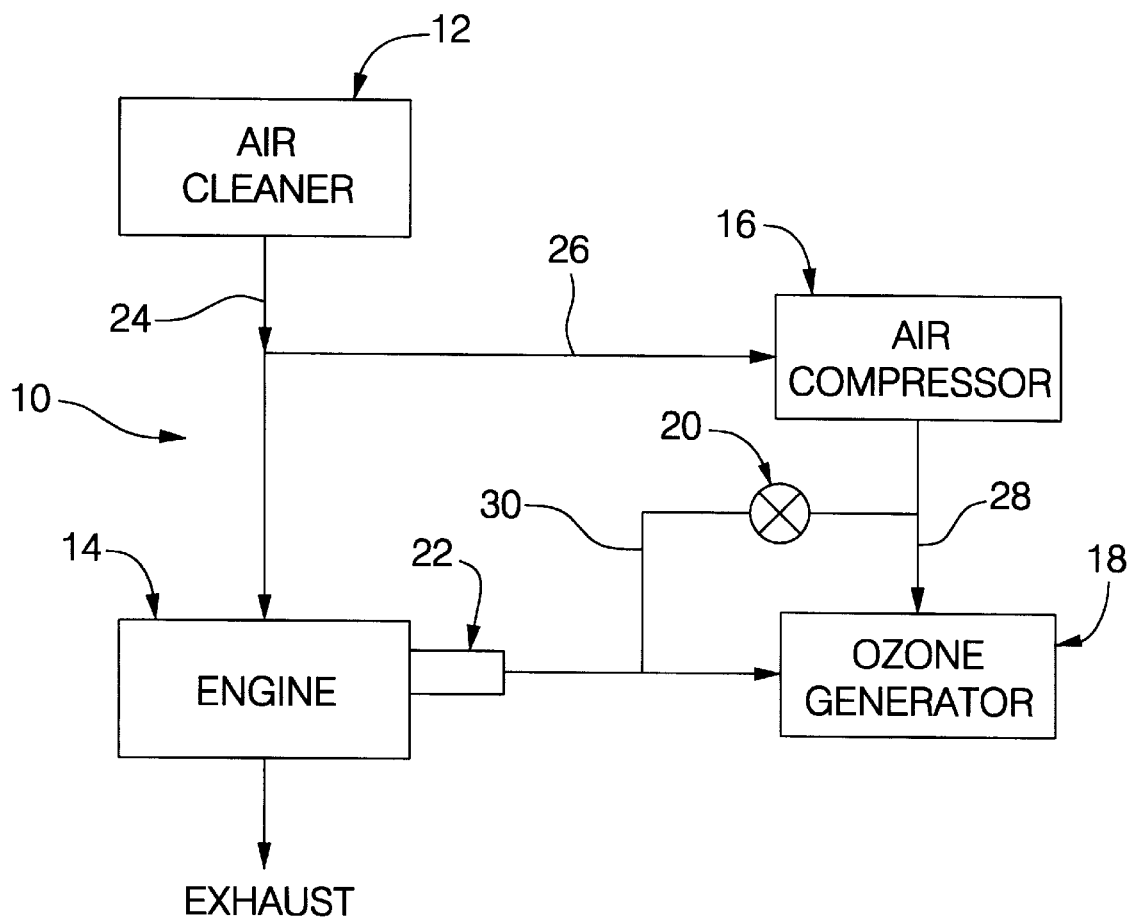

AIR-ASSISTED FUEL INJECTOR WITH OZONE ENRICHMENT

TECHNICAL FIELD

This invention relates to air-assist fuel injection systems and, more particularly, to such injection systems having ozone enrichment.

BACKGROUND OF THE INVENTION

Air-assist fuel injectors have been proposed to improve the operating efficiency and emissions of internal combustion engines. These devices mix air with a fuel charge that is then injected directly into the engine combustion cylinder. The air-assist improves the atomization and distribution of the fuel charge as it enters the air within the combustion chamber of the cylinder. Air is separately ingested in a normal manner into the engine combustion chamber and may be compressed prior to the air assisted fuel injection.

Many air-assisted fuel injectors are known in the prior art. U.S. Pat. No. 5,353,991 issued Oct. 11, 1994 assigned to General Motors Corp. and U.S. Pat. No. 5,730,369 issued Mar. 24, 1998 assigned to General Motors Corp. are examples of air-assist fuel injectors that might employ the present invention.

SUMMARY OF THE INVENTION

It is an object of the present invention to provide an improved air-assist engine fuel injection system having ozone enrichment.

In one aspect of the present invention, a compressed air stream with ozone enrichment is supplied to an air-assist fuel injector. In another aspect of the present invention, the ozone enrichment is provided downstream of the air compressor. In yet another aspect of the present invention, an ozone generator is positioned in flow relation between an air compressor and an air-assist fuel injector.

In order to provide cleaner and more efficient internal combustion engines, direct injection engines having lean operation at part load conditions are recommended. The present invention provides a highly combustible air/fuel mixture at the ignition source by combining an ozone-enriched air to the air-assist fuel injector of the engine. The introduction of an ozone-enriched air-fuel mixture at the fuel injector enhances the ignitability of the mixture cloud at the source of ignition. This will provide an engine operation with improved efficiency and a reduction in unburned exhaust products of combustion.

BRIEF DESCRIPTION OF THE DRAWINGS

The drawing is a block diagram of an engine fuel system incorporating the present invention.

DESCRIPTION OF AN EXEMPLARY EMBODIMENT

An engine combustible air-fuel mixture supply system 10 includes an air cleaner or filter 12, an engine 14, an air compressor 16, an ozone generator 18 and a bypass valve 20. The engine 14 has a plurality of air-assist fuel injectors 22. Air is drawn through the air cleaner 12 in the normal fashion of either a four stroke or two stroke cycle engine 14, primarily as a function of engine speed and displacement. Additional air, generally less than 5%, is drawn through the air cleaner 12 by the operation of the air compressor 16 for delivery to the air-assist fuel injectors 22. A branch passage 26 connects the filtered air in the passage 24 with the air compressor 16. The air compressor delivers air at an elevated pressure to the ozone generator 18 through a passage 28. The pressurized air takes ozone from the generator 18 and delivers an ozone-enriched stream of air to the air-assist fuel injectors 22.

The bypass valve 20 controls an air flow bypass passage 30 around the ozone generator 18 to control the amount of ozone enrichment that is delivered to the air-assist fuel injectors 22. The bypass valve can be controlled by the operator or by the conventional engine electronic control system, not shown. As is well known, the electronic control systems for engines incorporated a programmable digital computer that controls spark timing, fuel injection timing, fuel injection amount, and other functions. The bypass valve 20 can be controlled such that the amount of ozone-enriched flow delivered to the air-assist injectors 22 is variable between minimum and maximum percentages of ozone enrichment. As more air is admitted through the bypass valve 20, less ozone-enriched fluid will be supplied through the ozone enrichment device 18.

During the intake stroke of the engine 14, air is ingested into the combustion cylinder of the engine 14 and subsequently compressed during the compression stroke of the engine 14. The output flow of the air compressor 16 becomes ozone-enriched fluid, and the compressed air/ozone mixture blasts fuel into the cylinder to create a stratified air/fuel mixture in the combustion chamber of the engine 14. The air/fuel mixture is ignited by a spark plug or by compression ignition to cause a rapid rise in pressure and temperature in the combustion chamber, resulting in a power stroke at the engine 14. The ozone-enriched air-fuel mixture is closest to the source of ignition. This results in improved flame propagation and a more ignitable and stable ignition of the air/fuel mixture. The engine 14 can operate at significantly leaner air/fuel ratios than a conventional air-assist fuel-injected engine because of the ozone-enriched air-fuel charge that is delivered at the source of ignition.

The ozone generator can take on different forms; however, the most common form of ozone generation is by corona discharge. This method of ozone generation, as well as other methods, is well known in the art. The level of ozone enrichment can be measured with currently available measuring techniques so that the proper amount of ozone enrichment can be employed for the specific fuel used and the operating condition of the engine. Since ozone is a very reactive, the ozone generator 18 is preferably positioned downstream of the air compressor 16 to reduce the likelihood of corrosive damage to the compressor 16.

What is claimed is:

1. A fuel injection system for an internal combustion engine comprising:

an internal combustion engine having a combustion chamber;

an air-assist fuel injector disposed to supply fuel to the combustion chamber;

an air supply disposed to supply ambient air to the combustion chamber;

ozone enrichment means for supplying an ozone-enriched air mass to said stream of pressurized air; and a compressor for elevating the pressure of a portion of the air supply and delivering a stream of ozone-enriched pressurized air to said air-assist fuel injector of said internal combustion engine.

2. The fuel injection system for an internal combustion engine defined in claim 1 further comprising:

said ozone enrichment means being disposed in fluid flow relation between said compressor and said air-assist fuel injector.

3. The fuel injection system for an internal combustion engine defined in claim 1 further comprising:

a bypass valve positioned to provide a bypass flow of air from said compressor to said air-assist fuel injector without ozone enrichment.

4. The fuel injection system for an internal combustion engine defined in claim 1 further comprising:

said ozone enrichment means being disposed in fluid flow relation downstream of said compressor and upstream of said air-assist fuel injector; and a bypass valve positioned to provide a bypass flow of air from said compressor to said air-assist fuel injector in bypassing relation to said ozone enrichment means.

* * * * *